United States Patent [19]

Saunders et al.

[11] Patent Number: 5,044,847
[45] Date of Patent: Sep. 3, 1991

[54] POSITIVE LOCKING TIE-DOWN SYSTEM

[75] Inventors: Gerald A. B. Saunders, Sydenham; Henk W. Wevers, Glenburnie; David Siu, Kingston, all of Canada

[73] Assignee: Queen's Univeristy at Kingston, Kingston, Canada

[21] Appl. No.: 480,391

[22] Filed: Feb. 15, 1990

[51] Int. Cl.$^5$ .............................................. B60P 7/08
[52] U.S. Cl. ............................... 410/101; 24/663; 24/590; 24/265 CD; 410/7; 410/112; 410/66; 410/51
[58] Field of Search ................. 410/7, 10, 11, 12, 23, 410/51, 55, 101, 104, 105, 66, 112; 24/265 CD, 287, 590, 593, 597, 663

[56] References Cited

U.S. PATENT DOCUMENTS

| | | | |
|---|---|---|---|
| 1,199,690 | 9/1916 | Gillan | 24/597 |
| 1,404,014 | 1/1922 | Daniels | 24/663 |
| 1,475,865 | 11/1923 | Peters | 24/663 X |
| 3,367,000 | 2/1968 | Schluter | 24/597 |
| 3,369,842 | 2/1968 | Adams et al. | 24/196 |
| 3,429,537 | 2/1969 | Jantzen | 24/265 CD |
| 3,686,715 | 8/1972 | Brodnicki | 24/265 CD X |
| 4,427,210 | 1/1984 | Wevers | 410/23 X |
| 4,492,403 | 1/1985 | Blomgren et al. | 410/10 X |
| 4,577,375 | 3/1986 | Beaussant | 24/582 X |
| 4,688,843 | 8/1987 | Hall | 410/105 X |
| 4,886,403 | 12/1989 | Gresham | 410/10 |
| 4,966,392 | 10/1990 | Featon et al. | 410/7 X |

Primary Examiner—Robert J. Spar
Assistant Examiner—William M. Hienz
Attorney, Agent, or Firm—Richard J. Hicks

[57] ABSTRACT

A floor anchor pocket for mounting in a vehicle designed to carry wheelchairs or cargo is described. The pocket is provided with an internally located spring and a specially shaped cut-out so as to provide positive self locking for a tie down strap hook which is insertable therein.

9 Claims, 3 Drawing Sheets

POSITIVE LOCKING TIE-DOWN SYSTEM

FIELD OF INVENTION

This invention relates to a tie down system for wheelchairs, cargo containers and the like and more particularly to a floor mounted locking device adapted to receive a hook ended wheelchair tie down strap.

BACKGROUND OF INVENTION AND PRIOR ART

Wheelchair restraint systems designed to hold a wheelchair securely in a van or bus used to transport wheelchairs and their occupants are well known in the art. Attention is directed particularly to U.S. Pat. No. 4,427,210 and its Canadian counterpart Pat. No. 1,160,907 both of which issued on 24 Jan. 1984 and which are assigned to the assignee of the present application. In this patent there is described a wheelchair tie down system comprising a first pair of straps releasably securable to the front of a wheelchair and to anchor points in the floor of the carrying vehicle; a second pair of straps releasably securable to the rear of a wheelchair and to anchor points in the floor of the carrying vehicle; and a third pair of straps designed to encircle the passenger, the free ends of which either engage the second pair of straps directly or through a bracket member, in such a way that the second and third pairs of straps lie in a straight line so that in a crash situation the force applied to the third straps by the passenger is transmitted directly to the floor and not to the relatively weak frame members of the chair. It will be appreciated that four floor anchor points must be provided in the floor of the vehicle for each wheelchair to be carried. These anchor points may be in the form of ring bolts to which dog leash type hooks at the end of the straps can be snap fastened, or they may be reinforced pockets into which a simple open hook is inserted. The former has the advantage that the lock is positive, i.e. it is unlikely to release accidentally, but it has the disadvantage that an attendant must bend down to fasten and unfasten the hook. The latter has the advantage that it is easily inserted but the disadvantage that the hook can become detached accidentally by vibration. Certain jurisdictions have enacted legislation requiring a positive locking device to secure wheelchair tie down systems. There is, therefore, a considerable need for a simple, inexpensive, floor pocket which can provide a positive lock for a conventional hook on a wheelchair tie down system.

OBJECT OF INVENTION

It is an object of the present invention to provide a floor pocket, for a vehicle designed to carry wheelchairs or other types of cargo, which provides a positive locking arrangement for conventional open hooks used in tie down systems.

It is another object to provide a floor plate which provides a self locking arrangement.

BRIEF DESCRIPTION OF INVENTION

By one aspect of the present invention there is provided a wheelchair or cargo anchoring device floor mountable in a vehicle for carrying wheelchairs, said device comprising:
(a) receptacle means;
(b) means to secure said receptacle means to said vehicle floor;
(c) planar cover means rigidly secured on said receptacle means in overlying relationship thereto; and
(d) spring means contained between said receptacle means and said cover means;
said cover means having a substantially quadrilateral opening defined therethrough having a pair of opposed parallel sides and a pair of shaped sides substantially perpendicular thereto such that a wheelchair tie down hook may be inserted in a central position of said opening intermediate said pair of parallel sides and moved to a locked position against one of said parallel side in which said spring means and both of said shaped sides cooperate to releasably retain said hook in said locked position.

DETAILED DESCRIPTION OF PREFERRED EMBODIMENTS

Figure 1:
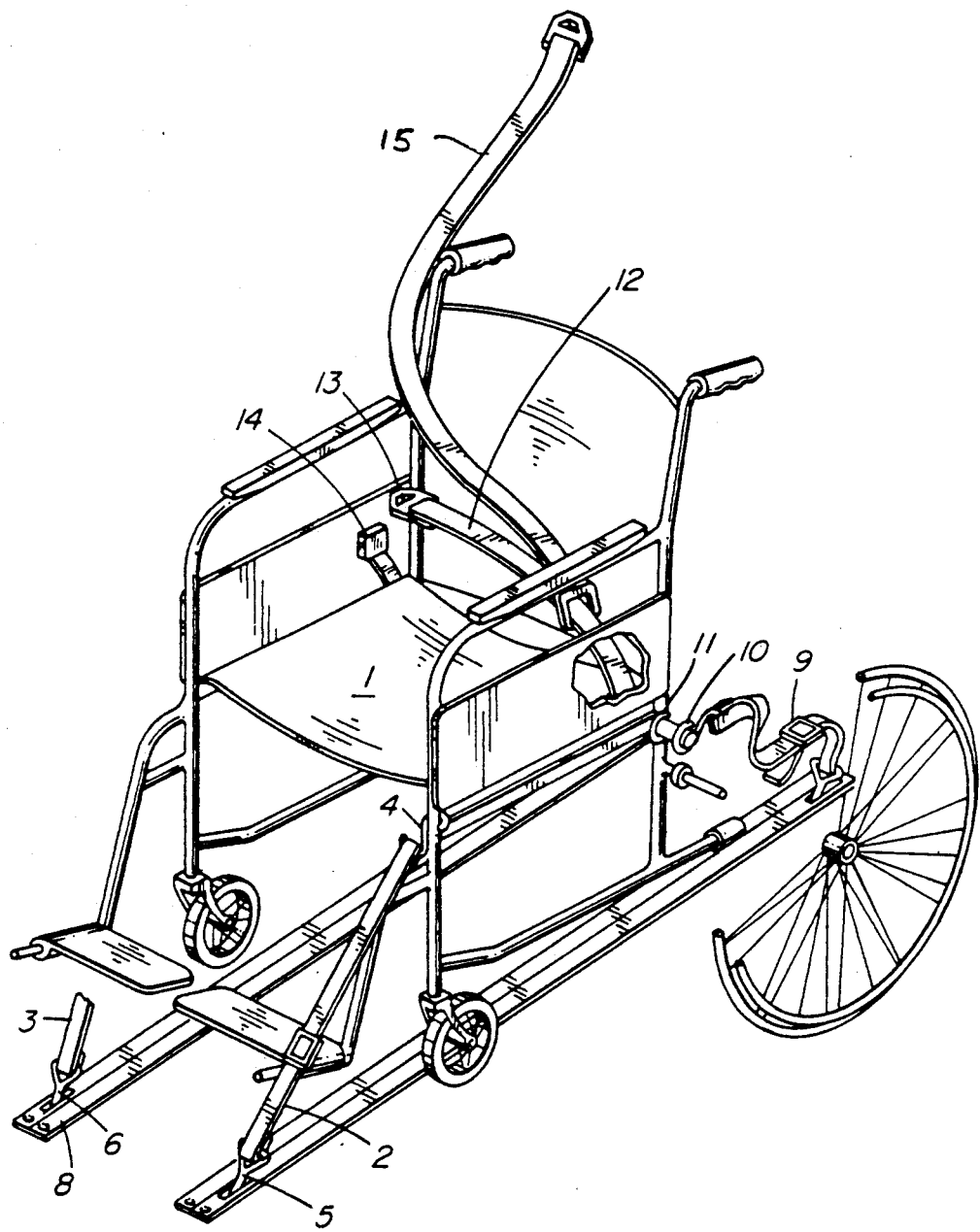
FIG. 1 is a perspective view of a wheelchair and tie down system according to the prior art.

In FIG. 1 there is shown a wheelchair with a tie down system such as that described in U.S. Pat. No. 4,427,210. The chair 1 is provided with four tie down straps 2,3, having upper hooks 4 for releasable attachment to chair 1 and lower hooks 5,6 for releasable attachment to floor anchor tracks 7,8. Rear straps 9 are releasably attachable to further anchor points in floor anchor tracks 7,8 and are provided with hooks 10 which are preferably secured to brackets 11 mounted on the chair 1. A lap belt 12 is also secured to brackets 11 and the free ends thereof are provided with a tongue 13 and releasable lock member 14. A shoulder belt 15 which is securable at one end to the vehicle roof or side wall, and at the other end thereof releasably securable to lap belt 12 may also be provided. In an alternative embodiment bracket 11 is eliminated and the lap belt 12 is attached to belt 9 at hook 10, which engages the chair 1. In either embodiment loads applied to belt 12 and to belt 9 are transmitted in a straight line. While floor track anchors 7,8 are easy to install and allow for various positions of the chairs in the vehicle, there are certain conditions, particularly when the belts are not sufficiently tightly adjusted, under which the hooks 5,6 can become detached accidentally through vibration or otherwise.

Figure 2:
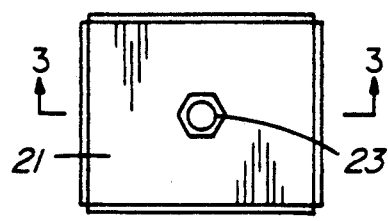
FIG. 2 is a plan view of the receptacle part of the anchor device of the present invention.
Figure 3:
FIG. 3 is a cross sectional view of the anchor device of FIG. 2.

In order to overcome this disadvantage and to comply with legislative requirements a novel floor pocket has been developed which provides a positive lock for the tie down hook when inserted. The pocket is shown in plan view in FIG. 2 and in cross section in FIG. 3. A substantially rectangular shallow cup 21 is provided with a central depression 22 designed to receive a heavy bolt 23 which can be secured through the floor of a vehicle (not shown), preferably within a floor channel so that the pocket is flush with the vehicle floor. Cup 21 is preferably fabricated from ⅛" stainless steel plate material.

Figure 4:
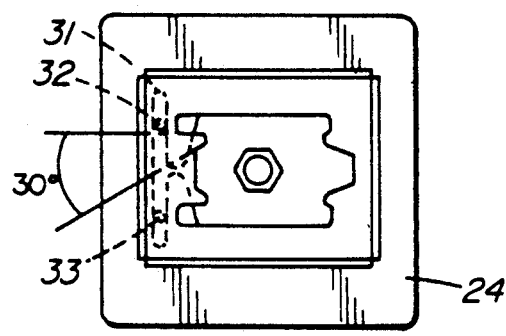
FIG. 4 is a plan view of one embodiment of the anchor device of the present invention.
Figure 5:
FIG. 5 is a cross sectional view of the device of FIG. 4.
Figure 6:
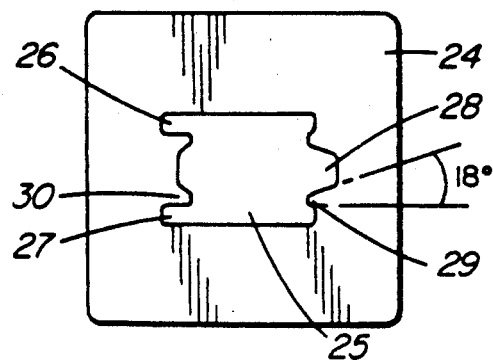
FIG. 6 is a plan view of the cover plate used in the device of FIG. 5.

A cover plate 24 is welded over the open side of cup 21 as shown in FIGS. 4 and 5. The cover plate 24 is provided with a central cut-out 25, as shown more clearly in FIG. 6. Cut-out 25 is of irregular shape, the purpose of which will be described in more detail hereinafter. Specifically cut-out 25 provides slots 26, 27 along opposed transverse parallel marginal side edges of the cut-out 25, specifically adapted to receive a tie down hook 5, 6. Between slots 26, 27 there is provided a central area 28 which is somewhat wider in the longitudinal direction than slots 26, 27. Area 28 has angled transverse side walls 29, 30 which are at different angles to the transverse plane. Preferably, side 29 is angled at about 18° and side 30 is at about 30°. Contained within cup 21 and beneath cover 24 there is provided a resilient flat spring member 31 held in place, adjacent side 30, by pins 32, 33.

Figure 7:
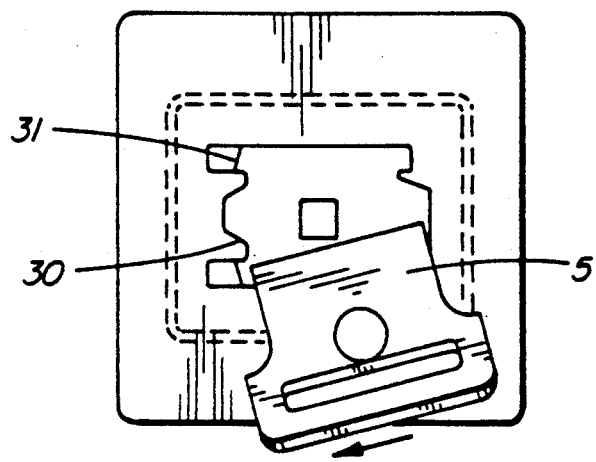
FIG. 7 is a plan view showing insertion of a hook into the device of the present invention.
Figure 8:
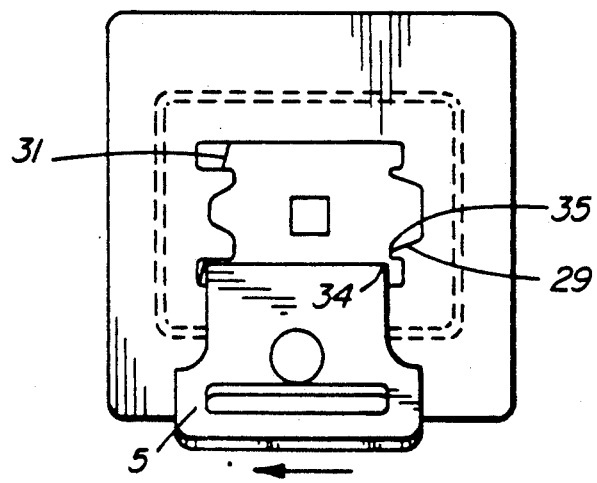
FIG. 8 is a plan view showing movement of the hook towards the locked position.
Figure 9:
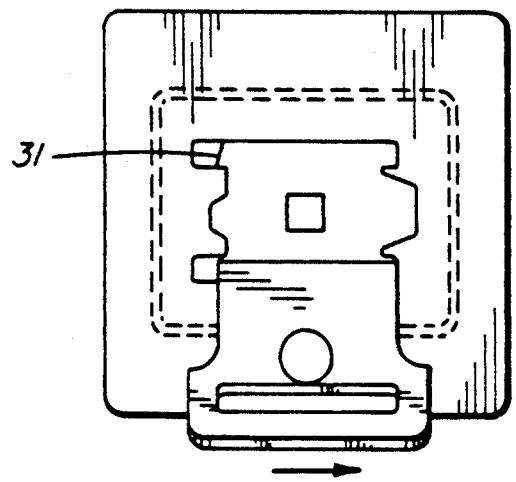
FIG. 9 is a plan view of the hook in fully locked position.

In operation, as seen more clearly in FIGS. 7, 8 and 9, a hook 5 is inserted into the central area 28 and by virtue of the 18° angle on side 29, which is less than the angle on side 30, the hook automatically tends to assume the position shown in FIG. 7, i.e. slides off side 30 into slot 27. A sharp pull upwardly and away from the central area on the appended strap 2, 3, 9 will cause the hook 5 to compress spring 31, slide off face 29 and snap into the position shown in FIG. 8. Compressed spring 31 will then extend towards its rest position, thus pushing the hook into the locked position shown in FIG. 9 with the edges of the hook under the ends of faces 29, 30. To release, it is merely necessary to push hook 5 against spring 31, to compress it slightly so that corner 34 of hook 5 clears the end 35 of the face 29 and re-enters central area 28, from which hook 5 can be lifted clear.

While this invention has been described with particular reference to anchoring wheelchairs, it will be appreciated by those skilled in the art that the tie-down anchor pocket is equally applicable to securing loads of a more general nature such as pallets, boxes and so forth.

We claim:

1. An anchoring device, floor-mountable in a load carrying vehicle, said device comprising:
   (a) receptacle means having an open top;
   (b) planar cover means rigidly secured on said receptacle means in overlying relationship over said open top;
   (c) means to mount and secure said receptacle means and cover means in said vehicle floor such that, in operative position, said cover means is substantially flush with said vehicle floor;
   (d) flat resilient spring means contained in said receptacle means adjacent one marginal side wall thereof; said cover means having an irregularly shaped opening defined therethrough including a pair of opposed parallel sides and a pair of shaped sides substantially perpendicular thereto such that a load tie-down hook may be inserted in a central portion of said opening intermediate said pair of parallel sides and moves to a locked position against one of said shaped sides in which said resilient spring means urges said hook laterally against said one shaped side and thus releasably retains said hook between said shaped sides and adjacent one of said parallel sides in said locked position.

2. An anchoring device as claimed in claim 1 wherein said receptacle means and said cover means are fabricated from plate steel.

3. An anchoring device as claimed in claim 2 wherein said steel is stainless steel.

4. An anchoring device as claimed in claim 3 wherein said cover means is welded to said receptacle means.

5. An anchoring device as claimed in claim 1 wherein each of said shaped sides includes a portion thereof at an acute angle to a respective one of said parallel sides.

6. An anchoring device as claimed in claim 5 wherein said acute angle on one respective shaped side is less than said acute angle on the other said shaped side.

7. An anchoring device as claimed in claim 6 wherein said acute angle on said one shaped side is about 18° and on the said other shaped side is about 30°.

8. An anchoring device as claimed in claim 6 wherein said mounting and securing means comprises bolt means through said receptacle means.

9. An anchoring device as claimed in claim 6 wherein said receptacle means and said cover means are substantially rectangular.

* * * * *